United States Patent [11] 3,627,810

[72] Inventor  Kuo Y. Chang
              Midland, Mich.
[21] Appl. No. 2,365
[22] Filed     Jan. 12, 1970
[45] Patented  Dec. 14, 1971
[73] Assignee  The Dow Chemical Company
              Midland, Mich.

[54] PROCESS FOR MAKING ORGANIC CARBONATES
     5 Claims, No Drawings
[52] U.S. Cl. .................................................. 260/463
[51] Int. Cl. ................................................ C07c 69/00
[50] Field of Search .......................................... 260/463

[56] References Cited
     FOREIGN PATENTS
     1,207,790  2/1960  France

Primary Examiner—Elbert L. Roberts
Assistant Examiner—Diana G. Rivers
Attorneys—Griswold & Burdick and C. E. Rehberg ABSTRACT: Carbonate esters of higher alcohols are made by the reaction of lower chloroformates with a solution of an alkali metal salt of a higher alcohol in a higher alcohol. The esters thus produced are essentially halogen-free and hence are especially useful in hydraulic fluids, lubricants and plasticizers.

PROCESS FOR MAKING ORGANIC CARBONATES

BACKGROUND OF THE INVENTION

Carbonate esters of higher alcohols are useful as hydraulic fluids, lubricants, plasticizers and other purposes requiring very low halogen content. The presence of halogen, even in extremely low concentrations is objectionable in these uses because it causes problems of corrosion of metals or instability of the esters themselves or of the plastics in which they are used.

The most direct and inexpensive process for making carbonate esters involves reacting the alcohol with phosgene, with or without the use of an acid acceptor. It has been observed, however, that the product thus produced is high in chlorine content, and no practical way has been found for satisfactorily removing such impurity. Various indirect syntheses have been devised to produce carbonates of low chloride content.

The copending application of Ludo K. Frevel and David F. Gransden, Ser. No. 784,266, filed Dec. 16, 1968, discloses the preparation of certain higher carbonate esters by the alcoholysis of diethyl carbonate.

The copending application of Ludo K. Frevel and Jo Ann Gilpin, Ser. No. 798,765, filed Feb. 12, 1969, discloses the preparation of higher carbonate esters by the alcoholysis of cyclic alkylene carbonates.

The copending application of Ludo K. Frevel, Ser. No. 850,215, filed Aug. 14, 1969, discloses a process for making higher carbonate esters by reacting an alkali metal bicarbonate ester with a methyl halide, thus to produce the methyl ester, and then alcoholyzing this with the higher alcohol, thus to make the higher ester.

The above applications disclose utility of the products as hydraulic fluids and as plasticizers for various synthetic resins.

SUMMARY OF THE INVENTION

According to the present invention, carbonates of higher alcohols are made by the reaction of a lower chloroformate with a mixture of at least a molar equivalent of each of (1) a higher alcohol and (2) an alkali metal salt of a higher alcohol. The reaction can be represented as follows:

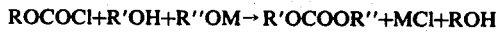

ROCOCl+R'OH+R"OM → R'OCOOR"+MCl+ROH wherein M is an alkali metal, R is the residue of a lower alcohol, ROH, and R' and R" are the residues of higher alcohols, R'OH and R"OH. The latter two alcohols may be the same or different.

By "lower alcohol" is meant the primary aliphatic monohydric alcohols having up to four carbon atoms, while by "higher alcohols" is meant those having more than four carbon atoms. The suitable lower alcohols include methanol, ethanol and propanol, while the suitable higher alcohols include alkanols, such as amyl alcohol, hexanol, decanol and dodecanol, and alkoxyalkanols, such as 2-butoxyethanol, 2-propoxy-1-propanol, 2-(2-methoxyethoxy)ethanol, 2-(2-butoxyethoxy)ethanol and the like. The preferred ones have the formula R(OA)$_n$OH wherein R is lower alkyl, A is a vicinal alkylene radical and $n$ is an integer 1–3.

Ordinarily the higher alcohols, R'OH and R"OH, are the same alcohol. When this is the case, it is convenient to prepare the mixture of R'OH and R"OM by simply dissolving an alkali metal, or lower alkoxide salt thereof, in an excess of the higher alcohol and removing the evolved hydrogen or lower alkanol, thus producing a solution of the alkali metal salt of the higher alcohol in the excess higher alcohol. This solution should contain at least 1 m. of alcohol for each mole of the alkali metal alcoholate, and preferably at least about 1.5 m. The excess not only aids in completing the reaction but serves as reaction medium, thus facilitating mixing and heat transfer by maintaining fluidity.

Reaction temperatures can be varied widely, though it is generally preferred to conduct the reaction at mild temperatures, such as 25°–50° C.

Since the reaction is exothermic, it is convenient to slowly add the chloroformate to the alcohol-alcoholate mixture or vice versa. The preferred procedure is to add the latter to the former, since the course of the reaction can then be followed by pH measurement. The alcohol-alcoholate mixture is added until the reaction mixture is alkaline (pH at least 7 by Phydrion paper), this signifying that all of the chloroformate has reacted. After filtration of the mixture to remove salt, excess alcohol, byproduct alcohol and other volatile matter is stripped from the product and any solids are removed by filtration. The product then is ordinarily sufficiently pure for use without further treatment, though if desired it may be distilled in vacuum or otherwise refined. The chloride content of such products is usually less than 5 p.p.m.

Since in the reaction the lower ROH, is displaced by the higher alcohol, R'OH, it is advantageous to remove it continuously as it is formed, thus driving the displacement to completion. This is conveniently done by adjusting the reaction conditions to permit distillation of the lower alcohol. At the preferred temperatures of 25°–150° C. this can be accomplished by operating at a reduced pressure such that the alcohol distills. Pressures of 10–200 mm. are usually suitable.

One advantage of the process of the invention is that the lower chloroformate used as a reactant can conveniently be prepared in situ by reaction of phosgene with the lower alcohol and then used without purification.

SPECIFIC EMBODIMENTS

The practice of the invention is illustrated by the following examples.

EXAMPLE 1

Into 70.4 g. (1.5 mole) of stirred absolute ethanol, chilled in a cold running water bath, was passed 100 g. (1.01 mole) of phosgene in 1 to 2 hours. The reaction mixture was then heated to and kept at 75° until the evolution of hydrogen chloride became very slow. To the mixture was added dropwise 344.2 g. of the sodium salt of 2-(2-methoxyethoxy)ethanol prepared by distilling off water and some alcohol from 44.4 (1.11 mole) of sodium hydroxide and 486.2 g. (4.05 mole) of 2-(2-methoxyethoxy)ethanol at 25-mm. Hg pressure) so that the temperature was below 35°. At the end of the addition, the reaction mixture had a pH of about 7 to 8 to Phydrion paper. The mixture was filtered to remove sodium chloride which was washed with 11.3 g. ethanol. A Dry-Ice cold trap was used during filtration to collect ethanol (3.88 g.). The filtrate was first distilled at atmospheric and then at 200-mm. Hg pressure to recover ethanol (62.0 g.).

Finally, the pressure was reduced to 25 mm. to recover the excess methoxyethoxyethanol used in the reaction (121.1 g.). The residue was allowed to cool to room temperature and filtered by suction to give 81.6 percent yield of bis[2-(2-methoxyethoxy)ethyl] carbonate (based on phosgene) and 96.5 percent, based on methoxyethoxyethanol. Its purity, by GLC was 96 percent and the total chloride content was less than 2 p.p.m. as determined by neutron activation analysis.

While ordinarily the symmetrical carbonates are the desired products, it is possible to make unsymmetrical esters by the present process. This is conveniently done by using as reactants one higher alcohol and the alkali metal salt of a second, different alcohol, i.e. R' and R" are different in the above formulas.

The process of the invention can be carried out in two steps instead of one. In the first, the chloroformate is reacted with the alkali metal alcoholate to produce a mixed lower-higher ester. In the second step the mixed ester is reacted with a higher alcohol to displace the lower alcohol and produce the final product. In such a two-step process it is preferred to use an inert organic solvent in the first step. Suitable solvents include toluene, halohydrocarbons and ethers.

I claim:

1. The process for making an ester of the formula R'OCOOR'' by reacting a chloroformate having the formula ROCOCl with (a) an alcohol of the formula R'OH and (b) an alkali metal salt of the formula R''OM where in the above formulas R is the radical of a lower alcohol, ROH, and R' and R'' are the radicals of the same or different higher alcohols R'OH and R''OH.

2. The process of claim 1 wherein the alkali metal is sodium or potassium.

3. The process of claim 1 wherein ROH is methanol or ethanol.

4. The process of claim 1 wherein R'OH and R''OH are the same.

5. The process of claim 1 wherein R'OH and R''OH are independently of the formula $R(OA)_n$—OH wherein R is lower alkyl, A is a vicinal alkylene radical and $n$ is an integer 1–3.

* * * * *

PO-1050
(5/69)

UNITED STATES PATENT OFFICE
CERTIFICATE OF CORRECTION

Patent No. 3,627,810            Dated    14 December 1971

Inventor(s)   Kuo Y. Chang

It is certified that error appears in the above-identified patent and that said Letters Patent are hereby corrected as shown below:

Column 1, line 75, delete "25°-50°" and insert -- 25°-150° --.

Column 2, line 16, insert -- alcohol -- between "lower" and "ROH,"; line 43 insert -- g. -- after "44.4".

Signed and sealed this 30th day of May 1972.

(SEAL)
Attest:

EDWARD M. FLETCHER, JR.
Attesting Officer

ROBERT GOTTSCHALK
Commissioner of Patents